April 21, 1942.  W. J. KIENE  2,280,411
PRESSURE INDICATOR
Filed Jan. 3, 1939
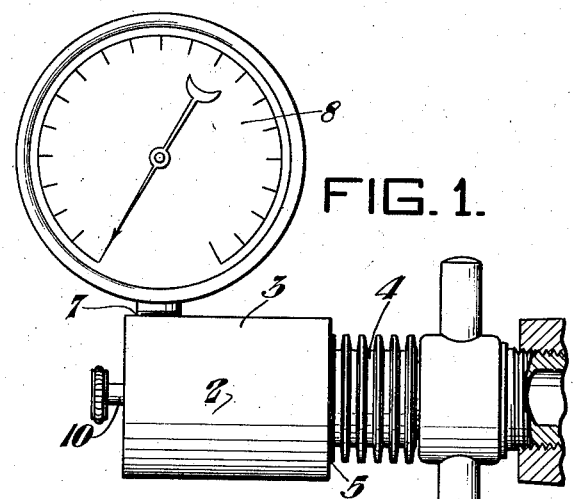
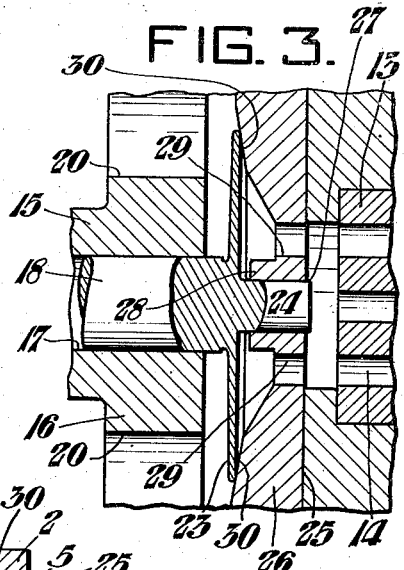
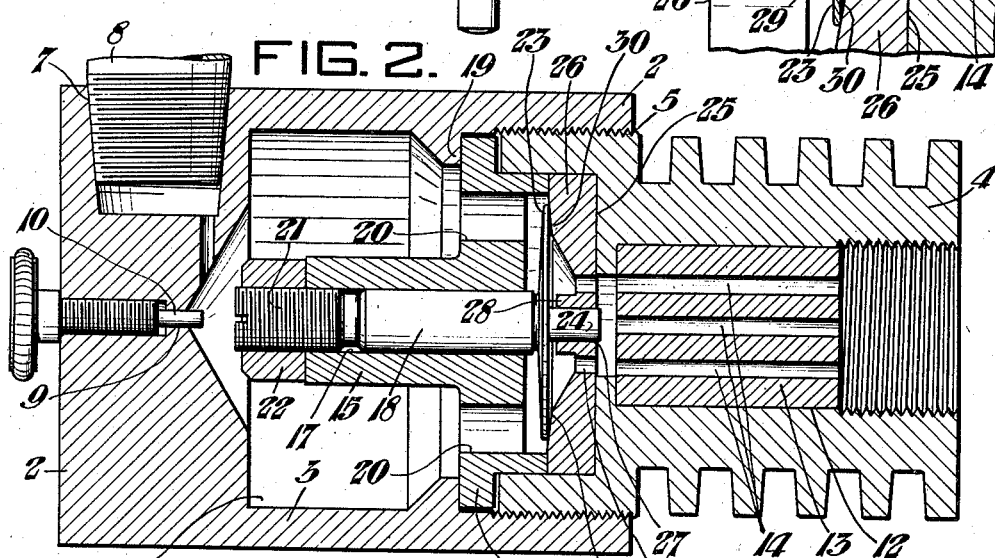
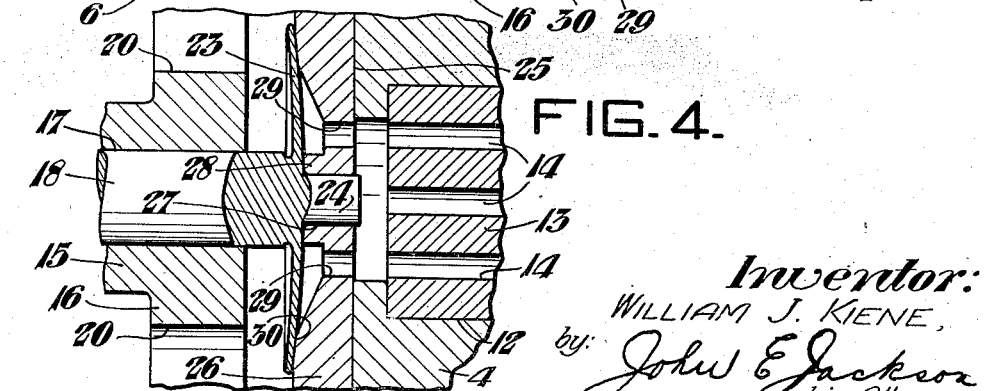
Inventor:
WILLIAM J. KIENE,
by: John E Jackson
his Attorney.

Patented Apr. 21, 1942

2,280,411

UNITED STATES PATENT OFFICE 2,280,411

PRESSURE INDICATOR

William J. Kiene, Chicago, Ill.

Application January 3, 1939, Serial No. 249,072

5 Claims. (Cl. 73—31)

This invention relates to a pressure indicator and, more particularly, to an improved pressure indicator for determining the maximum pressure in the cylinders of internal combustion engines and the like.

Various types of indicators and gages have been suggested and used for determining the maximum pressure in the cylinders of internal combustion engines, air compressors, liquid pumps, etc. The maximum pressure indicators commonly used employ pistons and springs and consequently are easily affected by dirt and gummy oil. They require careful handling and must not be allowed to overheat if they are to be at all accurate. They can only be operated continuously for short periods of time. A gage in combination with an ordinary check valve has been heretofore used but such a valve was not entirely satisfactory in that the pressure in the cylinder to be tested would have to be greater than the pressure tending to keep the valve closed or seated before the indicator would determine the pressure therein. That is to say, the pressure in the cylinder would have to overcome the force of the spring tending to keep the valve closed and the cohesion between the valve and its seat before it would be registered on the gage. Also, oil, liquid fuel and other foreign elements tend to adhere to a valve having such a large seating area, and the collection of such thereon and therearound tended to make the valve stick and would not permit it to operate freely, at times preventing the valve entirely from operating, which, of course, made such indicators inefficient and very unsatisfactory.

According to the present invention, there is provided a maximum pressure indicator having an improved type valve therein which will not stick and which has no spring associated therewith, and, at the same time, a pressure indicator in which all the above disadvantages will be eliminated.

It is one of the objects of the present invention to provide an improved pressure indicator for determining the pressure in the cylinders of internal combustion engines and the like which will function properly at all times to accurately and efficiently indicate the maximum pressure therein.

It is another object of this invention to provide a pressure indicator for determining the maximum pressure in cylinders of internal combustion engines and the like which is simple and inexpensive in its construction and, at the same time, one which is rugged and durable.

It is still another object of the invention to provide a pressure indicator for determining maximum pressure in the cylinders of internal combustion engines and the like having a flexible valve associated therewith in which the seating is variable and the area of seating thereof is controlled by the pressures therein.

Various other objects and advantages of this invention will be more apparent in the course of the following specification and will be particularly pointed out in the appended claims.

In the accompanying drawing there is shown, for the purpose of illustration, one embodiment which my invention may assume in practice.

In the drawing:

Figure 1 is a front elevation of the improved pressure indicator of my invention;

Figure 2 is a longitudinal section thereof;

Figure 3 is an enlarged detail of the valve used in connection with my invention, showing one position that it will assume; and Figure 4 is a view similar to Figure 3 showing another position the valve will assume.

Referring more particularly to the drawing, the improved maximum pressure indicator of my invention comprises a cylindrical housing 2 consisting preferably of an upper cylindrical part 3 and a smaller lower cylindrical part 4 which are connected at 5 by the externally threaded portion on the upper end of the lower part and the internally threaded portion on the lower end of the upper part. The upper part 3 of the housing has arranged therein a cylindrical chamber 6 and a threaded hole 7 preferably positioned in the wall thereof communicating therewith in which a suitable indicating gage 8 is adapted to be assembled. There is also arranged in the upper part 3 of the housing, preferably in the top wall thereof, an opening 9 communicating with the inner chamber 6 having an adjustable bleeder valve 10 of the pin type assembled therein.

The lower part 4 of the housing has a cylindrical hole 12 arranged axially therethrough with a cylindrical member 13 disposed therein, having a plurality of port holes 14 arranged therethrough. The lower part of the hole 12 is threaded for the purpose of attaching it to a coupling or other suitable means in order to connect it to the cylinder to be tested.

There is arranged centrally of the upper part 3 of the housing a valve supporting and guiding member 15 having an annular flange 16 arranged on the lower part thereof and having a longitudinally extending bole 17 arranged therethrough and axially positioned therein which is adapted to receive the valve stem 18. The outer portion of the flange 16 of the valve stem supporting member 15 is positioned between the upper end of the lower part 4 of the housing and an inwardly extending annular flange 19, and the valve supporting member is securely held in position thereby by the interconnection of the upper part 3 and the lower part 4, as can be readily seen in Figure 2 of the drawing. There is concentrically arranged in the flange 16 around the axial hole 17 in the member 15 a plurality of port holes 20. The upper end portion of the hole 17 is threaded for the purpose of receiving an adjusting screw 21 on which there is mounted a lock nut 22.

The valve stem 18 has arranged thereon, adjacent the bottom end thereof and preferably integral therewith, a relatively thin resilient disklike or diaphragm-like valve 23, and, below the disk-like valve, a relatively smaller cylindrical guide portion 24. In the upper end of the lower part 4 of the housing there is arranged on a flange portion or seat 25 carried thereby a valve seat member 26 having a hole 27 axially arranged therethrough which is adapted to slidably receive the lower guide portion 24 of the valve. There is provided in the center of the valve seat member 26, immediately around the axial hole 27, a stop portion 28 which is adapted to limit the downward movement of the valve. Around the hole 27 in the valve seat member 26 there is concentrically arranged a plurality of port holes 29 and on the upper face thereof there is arranged preferably an inwardly beveled valve seat 30 with which the resilient disk-like valve 23 is adapted to cooperate to open and close the passage leading to the chambers 6 in the cylindrical part 3.

In operation, the improved pressure indicator of my invention functions as follows:

The indicator is first suitably connected to the cylinder in which it is desired to determine the pressure. If the cylinder is cold, it will be usually necessary to have the bleeder valve 10 slightly open, especially in testing the pressure in cylinders of internal combustion engines at the start of operation for the reason that at such a time the gage will show an extremely high top pressure due to the violent pressure changes therein and this pressure has to be permitted to escape until the cylinder becomes warmer, so as to obtain the average pressure developed, but the bleeder valve is normally kept closed. The bleeder may be used at any time to reduce the pressure in the chamber 6 when normal leakage is too slow; that is, to bring the pressure back to normal after an abnormal rise.

The gases in the cylinders enter the lower part 4 of the housing 2 and pass up through the port holes 14 arranged in the cylindrical member 13 therein. They then pass up through port holes 29 in the valve seat member 26 forcing the flexible disk-like valve 23 upwardly and passing through the port holes 20 in the flange of the valve supporting member 15 into the chamber 6 in the upper part 3 of the housing. The valve opening is adjusted by means of the adjusting screw 21 which bears against the upper end of the valve stem 18 and is permitted to open about one-thousandth of an inch.

If the pressure decreases under the valve, the gas in the upper part 3 of the housing tends to pass back into the cylinder through the valve opening. As this takes place and the gases are set in motion between the valve 23 and its seat 30, there is a corresponding drop in pressure in this space (Bernoulli's theorem) and the valve is drawn to its seat and kept there due to the fact that the pressure on top of the valve is greater than the pressure against the bottom thereof. It will be seen that the flow of gas as described will cause a slight loss of pressure in the chamber 6 when the pressure in the cylinder decreases, but, with a sufficiently large chamber, this loss is negligible.

As the gas pressure in the cylinder decreases further, the gas pressure in the chamber 6 will force the disk-like valve downwardly against the stop portion 28 of the valve seat member 26 to a full seat, thereby springing the flexible disk-like valve to a cup-like shape, as shown in Figure 4. When the pressure in the cylinder increases, the valve is forced upwardly, due to the pressure against the bottom thereof, and, as the pressures become equalized, the valve again approaches a line contact with its seat due to the resiliency thereof, as shown in Figure 3. If the pressure in the cylinder rises above that in chamber 6, the valve is raised from its seat and gas is admitted into the chamber until the pressure therein equals that in the cylinder. The increased pressure in the chamber is then recorded on pressure gage 8.

It will be understood that in any check valve, the total pressure over the valve (gas pressure and loading spring pressure, if loaded) is balanced by the gas pressure under the valve plus the upward pressure of the seat. As the gas pressure under the valve is increased, the seat pressure is diminished and when the valve is about to leave its seat, the upward pressure of the seat is zero. Therefore the unit pressure necessary to raise the valve must bear a ratio to the unit pressure over the valve inversely as the ratios of the areas of the valve exposed to these pressures. Therefore a large valve with a narrow seat will raise with less excess of pressure under it than will a small valve with a greater proportion of seat area. But such a valve will soon pound out its seat due to the large pressure on it per unit of seat area. But the flexible valve of applicant's will not, due to the fact that the seating area increases with the pressure differences.

While I have shown and described one embodiment of my invention, it will be understood that this embodiment is merely for the purpose of illustration and description and that various other forms may be devised within the scope of my invention, as defined in the appended claims.

I claim:

1. A pressure indicator for determining the maximum pressure in the cylinders of internal combustion engines and the like comprising a housing, a pressure indicator connected to said body member, a valve stem arranged in said body member, means for slidably supporting and guiding said valve stem within said body member, a resilient disk-like valve carried by said valve stem, an inwardly beveled valve seat with which the disk-like valve is adapted to cooperate, means for limiting the downward movement of said valve, means for adjusting the position of said valve relative to said seat, and means for connecting said body member to the cylinder to be tested.

2. A pressure indicator for determining the maximum pressure in cylinders of internal combustion engines and the like comprising a hollow body member consisting of at least two interconnected parts, a pressure indicator connected to one of said parts, a valve supporting member having an annular flange arranged thereon with said flange positioned between said parts to securely hold it therein by the interconnection thereof, a valve stem slidably carried by said valve supporting member, a resilient disk-like valve carried by said valve stem, a valve seat member arranged in said body member, said valve seat member having means carried thereby for limiting the downward movement of said valve stem and an inwardly beveled seat with which said valve is adapted to cooperate, adjustable means carried by said valve stem supporting member for limiting the movement of said valve stem therein so as to adjust the position of the valve carried thereby relative to its seat, and means for connecting said body member to the cylinder to be tested.

3. A pressure indicator for indicating the maximum pressure in the cylinders of internal combustion engines and the like comprising a hollow body member, a pressure indicator connected to said body member, an inherently resilient disk-like valve, means for securely supporting and guiding said valve in said body member, a tapered valve seat arranged in said body member with which said valve is adapted to cooperate, said valve being constructed and arranged so that the seating thereof on said tapered valve seat is variable and controlled by the differences in pressure exerted on the top and bottom sides of said valve, means for limiting the movement of said valve in said body member, means for adjusting the position of said valve relative to said tapered seat, and means for connecting said body member to the cylinder to be tested.

4. A pressure indicator for determining the maximum pressure in the cylinders of internal combustion engines and the like comprising a hollow body member, a valve arranged in said body member, said body member having a chamber arranged therein to one side of said valve for collecting the gases issuing forth from the cylinder with which the indicator is to be used, a pressure indicator connected to said body member and communicating with said chamber, means arranged on the opposite side of said valve from said chamber for connecting said body member to the cylinder to be tested, said valve consisting of an inherently resilient diaphragm-like member and a tapered seat with which said diaphragm-like member is adapted to cooperate to close the valve, means for securely supporting said diaphragm-like member in said body member other than its seat so that the diaphragm-like member will have a limited movement therein, said valve being constructed and arranged so that the seating area of the diaphragm-like member on said tapered seat is variable and controlled by the differences in pressure exerted by the gases on the opposite sides of said diaphragm-like member, and means for adjusting said diaphragm-like member and said tapered seat relative to each other so as to adjust the valve opening.

5. A pressure indicator for determining the maximum pressure in cylinders of internal combustion engines and the like comprising a housing consisting of at least two interconnected parts, a valve arranged in said housing between said parts, said housing having a chamber arranged therein for collecting the gases issuing forth from the cylinder with which the indicator is to be used, a pressure indicator connected to said housing and communicating with the chamber therein, a valve supporting member positioned between said parts, said valve consisting of an inherently resilient diaphragm-like member and a tapered seat with which said diaphragm-like member is adapted to cooperate to close the valve, and means for securely supporting said diaphragm-like member in said housing other than its seat so that the diaphragm-like member will have a limited movement therein, said valve being constructed and arranged so that the seating area of the diaphragm-like member on said tapered seat is variable and controlled by the differences in pressure exerted by the gases on the opposite sides of said diaphragm-like member.

WILLIAM J. KIENE

CERTIFICATE OF CORRECTION.

Patent No. 2,280,411.　　　　　　　　　　　　April 21, 1942.

WILLIAM J. KIENE.

It is hereby certified that error appears in the printed specification of the above numbered patent requiring correction as follows: Page 1, second column, line 28, before "cylindrical" insert --hollow body member or--; page 2, second column, line 64, for "housing" read --hollow body member--; and that the said Letters Patent should be read with this correction therein that the same may conform to the record of the case in the Patent Office.

Signed and sealed this 9th day of June, A. D. 1942.

Henry Van Arsdale,
　　　　　　　　　　　　　　　　　　Acting Commissioner of Patents.

(Seal)